United States Patent
Browder et al.

(10) Patent No.: US 12,306,881 B1
(45) Date of Patent: May 20, 2025

(54) APPARATUS AND METHOD FOR GENERATIVE INTERPOLATION

(71) Applicant: Signet Health Corporation, North Richland Hills, TX (US)

(72) Inventors: Blake Browder, Dallas, TX (US); Joy Figarsky, Little Rock, AR (US)

(73) Assignee: Signet Health Corporation, North Richland Hills, TX (US)

(*) Notice: Subject to any disclaimer, the term of this patent is extended or adjusted under 35 U.S.C. 154(b) by 0 days.

(21) Appl. No.: 18/957,601

(22) Filed: Nov. 22, 2024

(51) Int. Cl.
| | |
|---|---|
| G06F 7/02 | (2006.01) |
| G06F 16/00 | (2019.01) |
| G06F 16/901 | (2019.01) |
| G06F 16/906 | (2019.01) |
| G06F 16/951 | (2019.01) |
| G06N 3/09 | (2023.01) |
| G06N 3/094 | (2023.01) |
| G06N 7/01 | (2023.01) |

(52) U.S. Cl.
CPC ........ G06F 16/906 (2019.01); G06F 16/9027 (2019.01); G06F 16/951 (2019.01); *G06N 3/09* (2023.01); *G06N 3/094* (2023.01); *G06N 7/01* (2023.01)

(58) Field of Classification Search
CPC .. G06F 16/906; G06F 16/9027; G06F 16/951; G06N 3/09; G06N 3/094; G06N 7/01
See application file for complete search history.

(56) References Cited

U.S. PATENT DOCUMENTS

| | | | |
|---|---|---|---|
| 5,778,345 | A | 7/1998 | McCartney |
| 8,666,771 | B2 | 3/2014 | Roesch et al. |
| 10,922,633 | B2 | 2/2021 | Ulizio et al. |
| 11,005,843 | B1* | 5/2021 | Sagduyu ............... H04L 51/046 |
| 2004/0243438 | A1 | 12/2004 | Mintz |
| 2020/0242170 | A1* | 7/2020 | Pogrebezky .......... G06F 16/986 |
| 2024/0028952 | A1* | 1/2024 | Donnell ................ G06F 16/287 |

* cited by examiner

*Primary Examiner* — Bruce M Moser
(74) *Attorney, Agent, or Firm* — Caldwell Intellectual Property Law

(57) ABSTRACT

An apparatus and method for generative interpolation is disclosed. The apparatus includes at least one processor and a memory communicatively connected to the at least one processor, wherein the memory contains instructions configuring the at least one processor to receive input data from one or more data sources, extract a plurality of attributes from the input data, classify the plurality of attributes into one or more hierarchical groups, detect at least one missing attribute in the one or more hierarchical groups, retrieve at least one crawled attribute as a function of the at least one missing attribute, wherein retrieving the at least one crawled attribute includes updating the one or more hierarchical groups as a function of the at least one crawled attribute using the group classifier and generate a hierarchical data structure as a function of the one or more updated hierarchical groups.

20 Claims, 7 Drawing Sheets

APPARATUS AND METHOD FOR GENERATIVE INTERPOLATION

FIELD OF THE INVENTION

The present invention generally relates to the field of data interpolation. In particular, the present invention is directed to an apparatus and method for generative interpolation.

BACKGROUND

As the amount of data generated across various fields continues to grow, the need for effective data management and processing has become increasingly critical. This has led to the development of advanced systems capable of organizing, analyzing, and visualizing data in ways that are both efficient and user-friendly. Traditional methods of manually generating and organizing data structures are often inefficient and prone to errors. As data structures become more complex, with deeper hierarchies and interconnected relationships, existing techniques struggle to ensure proper organization, scalability, and integration across different systems.

SUMMARY OF THE DISCLOSURE

In an aspect, an apparatus for generative interpolation is disclosed. The apparatus includes at least one processor and a memory communicatively connected to the at least one processor, wherein the memory contains instructions configuring the at least one processor to receive input data from one or more data sources, extract a plurality of attributes from the input data, classify the plurality of attributes into one or more hierarchical groups, wherein classifying the plurality of attributes includes generating classification training data, wherein the classification training data includes exemplary attributes correlated to exemplary hierarchical groups, training a group classifier using the classification training data and classifying the plurality of attributes using the trained group classifier, detect at least one missing attribute in the one or more hierarchical groups, wherein the at least one missing attribute is detected when an attribute of the plurality of attributes required to be in the one or more hierarchical group is absent, retrieve at least one crawled attribute as a function of the at least one missing attribute, wherein retrieving the at least one crawled attribute includes dynamically loading contents for retrieving the at least one crawled attribute from web sources until the at least one crawled attribute is found to fill the at least one missing attribute in the one or more hierarchical groups and updating the one or more hierarchical groups as a function of the at least one crawled attribute using the group classifier and generate a hierarchical data structure as a function of the one or more updated hierarchical groups.

In another aspect, a method for generative interpolation is disclosed. The method includes receiving, using at least a processor, input data from one or more data sources, extracting, using the at least a processor, a plurality of attributes from the input data, classifying, using the at least a processor, the plurality of attributes into one or more hierarchical groups, wherein classifying the plurality of attributes includes generating classification training data, wherein the classification training data includes exemplary attributes correlated to exemplary hierarchical groups, training a group classifier using the classification training data and classifying the plurality of attributes using the trained group classifier, detecting, using the at least a processor, at least one missing attribute in the one or more hierarchical groups, wherein the at least one missing attribute is detected when an attribute of the plurality of attributes required to be in the one or more hierarchical group is absent, retrieving, using the at least a processor, at least one crawled attribute as a function of the at least one missing attribute, wherein retrieving the at least one crawled attribute includes dynamically loading contents for retrieving the at least one crawled attribute from web sources until the at least one crawled attribute is found to fill the at least one missing attribute in the one or more hierarchical groups and updating the one or more hierarchical groups as a function of the at least one crawled attribute using the group classifier and generating, using the at least a processor, a hierarchical data structure as a function of the one or more updated hierarchical groups.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to apparatuses and methods for generative interpolation are disclosed. The apparatus includes at least one processor and a memory communicatively connected to the at least one processor, wherein the memory contains instructions configuring the at least one processor to receive input data from one or more data sources, extract a plurality of attributes from the input data, classify the plurality of attributes into one or more hierarchical groups, wherein classifying the plurality of attributes includes generating classification training data, wherein the classification training data includes exemplary attributes correlated to exemplary hierarchical groups, training a group classifier using the classification training data and classifying the plurality of attributes using the trained group classifier, detect at least one missing attribute in the one or more hierarchical groups, wherein the at least one missing attribute is detected when an attribute of the plurality of attributes required to be in the one or more hierarchical group is absent, retrieve at least one crawled attribute as a function of the at least one missing attribute, wherein retrieving the at least one crawled attribute includes s dynamically loading contents for retrieving the at least one crawled attribute from web sources until the at least one crawled attribute is found to fill the at least one missing attribute in the one or more hierarchical groups and updating the one or more hierarchical groups as a function of the at least one crawled attribute using the group classifier and generate a hierarchical data structure as a function of the one or more updated hierarchical groups.

Aspects of this disclosure allow for handling and organizing large and incomplete datasets by dynamically retrieving missing data and organizing them into hierarchical groups using a classifier. Aspects of the present disclosure can be used for generative data interpolation.

Exemplary embodiments illustrating aspects of the present disclosure are described below in the context of several specific examples.

Figure 1:
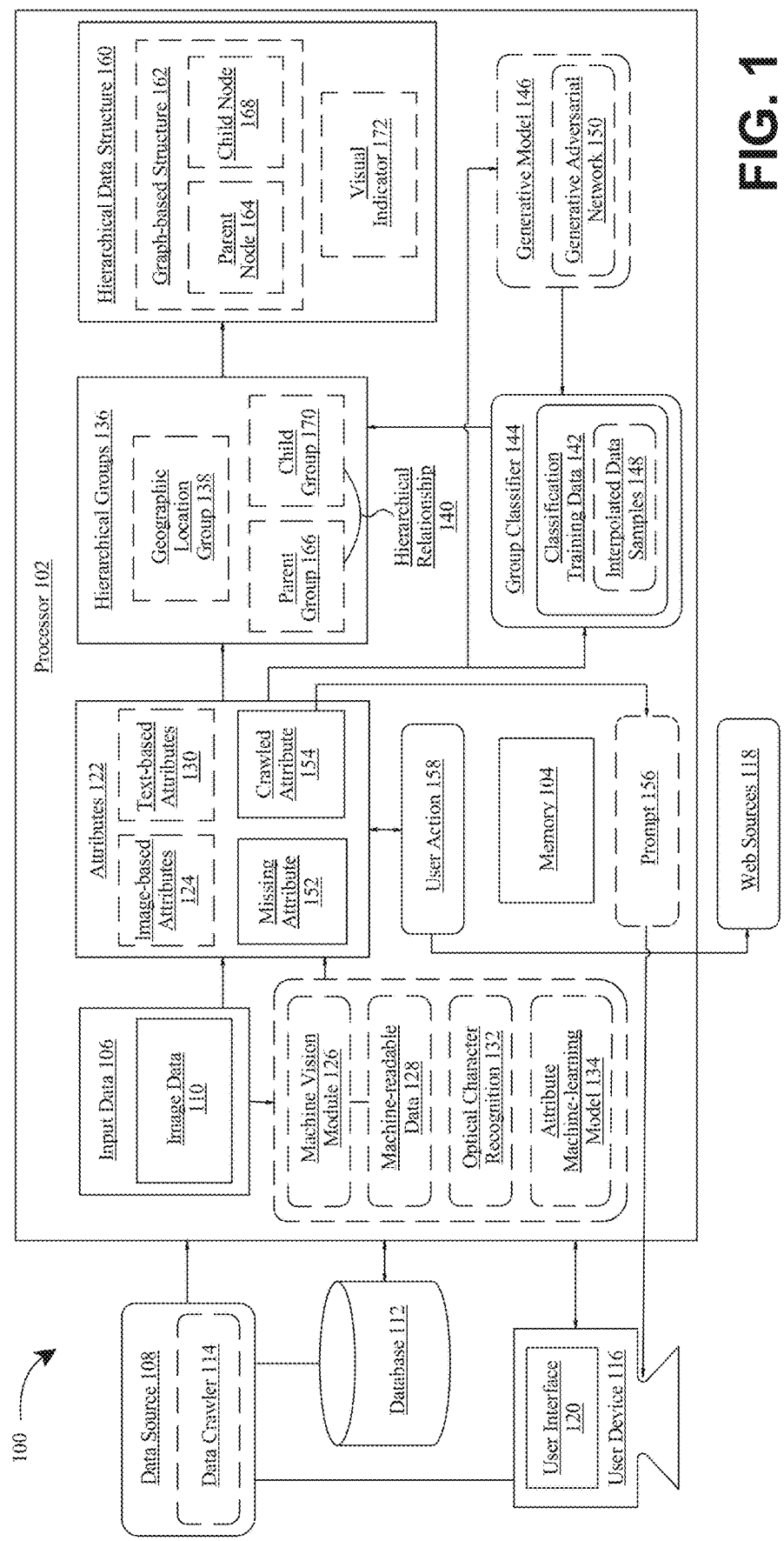
FIG. 1 illustrates a block diagram of an exemplary apparatus for generative interpolation.

Referring now to FIG. 1, an exemplary embodiment of an apparatus 100 for generative interpolation is illustrated. Apparatus 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which May operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 104 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 contains instructions configuring processor 102 to receive input data 106 from one or more data sources 108. For the purposes of this disclosure, "input data" is data that is input into an apparatus 100. In some embodiments, input data 106 may include various formats, including texts, images, audio, video, unstructured data or structured data. In some embodiments, input data 106 may include image data 110. For the purposes of this disclosure, "image data" is digital representations of visual information. As a non-limiting example, image data 110 may include images of facilities, document, subjects, medical professionals, and the like.

With continued reference to FIG. 1, in some embodiments, input data 106 may include information related to a facility. For the purposes of this disclosure, a "facility" is a physical location or building. As a non-limiting example, a facility may include hospital, factory, health care center, behavioral health center, and the like. For example, and without limitation, input data 106 may include bill, cost, expense reports, invoices, financial statements, insurance claims, pricing information, and records of transactions associated with the facility. For example, and without limitation, input data 106 may include operational data such as inventory logs, staffing schedules, patient or client records, production metrics, maintenance reports, utility usage data, and the like. For example, and without limitation, input data 106 may include compliance and regulatory information, such as licensing records, safety inspection reports, and certification documents relevant to the facility's operations. For example, and without limitation, input data 106 may include images (image data 110) of facilities, such as photographs, documents, or records of hospital premises, factory layouts, equipment setups, healthcare center interiors, or behavioral health center rooms.

With continued reference to FIG. 1, in some embodiments, input data 106 may include information related to a subject. For the purposes of this disclosure, a "subject" is an individual, entity, or group whose information is being collected. As a non-limiting example, subject may include a patient. For example, and without limitation, input data 106 may include a subject's personal information, such as name, date of birth, address, contact details, identification numbers (e.g., social security number or patient ID), and the like. For example, and without limitation, input data 106 may include medical information, including medical history, current diagnoses, prescribed medications, treatment plans, test results, imaging data, and health insurance details. For example, and without limitation, input data 106 may include clinical notes, doctor's observations, vital signs, and records of interactions with healthcare providers, such as appointments, follow-up schedules, and referrals. For example, and without limitation, input data 106 may include financial records related to the subject, such as billing statements, insurance claims, payment history, and invoices for medical services.

With continued reference to FIG. 1, in some embodiments, input data 106 may include information related to medical professionals. For example, and without limitation, input data 106 may include medical professionals' experience, personal information, qualifications, specializations, certification details, and the like. For example, and without limitation, input data 106 may include names, contact information, license numbers, education history, years of practice, affiliated institutions, and the like.

With continued reference to FIG. 1, for the purposes of this disclosure, a "data source" is an origin or repository from which data is obtained. As a non-limiting example, data source 108 may include database 112, data crawler 114, user device 116, application programming interfaces (APIs), and the like. In some embodiments, apparatus 100 may include a database 112. As used in this disclosure, "database" is a data structure configured to store data related to input data. In one or more embodiments, database 112 may include inputted or calculated information and datum related to input data 106. In some embodiments, a datum history may be stored in database 112. As a non-limiting example, the datum history may include real-time and/or previous inputted data related to input data 106. As a non-limiting example, database 112 may include instructions from a user, who may be an expert user, a past user in embodiments disclosed herein, or the like, where the instructions may include examples of the data related to input data 106.

With continued reference to FIG. 1, in some embodiments, processor 102 may be communicatively connected with database 112. For example, and without limitation, in some cases, database 112 may be local to processor 102. In another example, and without limitation, database 112 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store database 112. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, database 112 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, input data 106 may be derived from a data crawler 114. A "data crawler," as used herein, is a program that systematically browses the internet for the purpose of Web indexing. The data crawler 114 may be seeded with platform URLs, wherein the crawler may then visit the next related URL, retrieve the content, index the content, and/or measures the relevance of the content to the topic of interest. In some embodiments, processor 102 may generate data crawler 114 to scrape input data 106 from web sources 118. The web source 118 disclosed herein are further described below. The data crawler 114 may be seeded and/or trained with a reputable website to begin the search. Data crawler 114 may be generated by processor 102. In some embodiments, data crawler 114 may be trained with information received from user through a user interface 120. In some embodiments, data crawler 114 may be configured to generate a web query. A web query may include search criteria received from user. For example, user may submit a plurality of websites for data crawler 114 to search to input data 106. Additionally, data crawler 114 function may be configured to search for and/or detect one or more data patterns. A "data pattern" as used in this disclosure is any repeating forms of information. In some embodiments, data crawler 114 may be configured to determine the relevancy of a data pattern. Relevancy may be determined by a relevancy score. A relevancy score may be automatically generated by processor 102, received from a machine learning model, and/or received from user. In some embodiments, a relevancy score may include a range of numerical values that may correspond to a relevancy strength of data received from a data crawler 114 function. As a non-limiting example, a data crawler 114 function may search the Internet for input data 106.

With continued reference to FIG. 1, for the purposes of this disclosure, a "user device" is any device a user use to input data. As a non-limiting example, user device 116 may include a laptop, desktop, tablet, mobile phone, smart phone, smart watch, kiosk, screen, smart headset, or things of the like. In some embodiments, user device 116 may include an interface configured to receive inputs from a user. In some embodiments, user may manually input any data into apparatus 100 using user device 116. In some embodiments, user may have a capability to process, store or transmit any information independently.

With continued reference to FIG. 1, memory 104 contains instructions configuring processor 102 to extract a plurality of attributes 122 from input data 106. For the purposes of this disclosure, an "attribute" is a characteristic of input data. As a non-limiting example, an attribute 122 may include textual information, such as names, dates, addresses, identification numbers, medical terms, keywords, or labels. For example, and without limitation, an image of a document (image data 110) may contain attributes 122 like detected words, paragraphs, table structures, or logos. As another non-limiting example, an attribute 122 may include numerical values, such as prices, measurements, quantities, coordinates, or time stamps. As another non-limiting example, an attribute 122 may include visual features, such as shapes, colors, patterns, edges, or the like. Examples of attributes 122 described herein are mere examples and persons skilled in the art, upon reviewing the entirety of this disclosure, may appreciate various attributes 122 that can be extracted from input data 106. In some embodiments, attributes 122 may be stored in database 112 and processor 102 may retrieve attributes 122 from database 112. In some embodiments, user may manually input attributes 122.

With continued reference FIG. 1, in some embodiments, extracting a plurality of attributes 122 may include extracting image-based attributes 124 of a plurality of attributes 122 from image data 110 of input data 106 using a machine vision module 126 and converting the image-based attributes 124 into machine-readable data 128. For the purposes of this disclosure, an "image-based attribute" is a feature, property, or data point that is extracted from image data. As a non-limiting example, image-based attribute 124 may include patterns, edges, contours, shapes, textures, and the like. For example, and without limitation, image-based attribute 124 may include coordinates or relative location of different equipment within a facility floor in an image of a facility. For example, and without limitation, image-based attribute 124 may include an outline or footprint of different operational areas within a facility in a document of facility layout. For the purposes of this disclosure, "machine-readable data" data that is structured and formatted in a way that can be processed, interpreted, and used by a computer. As a non-limiting example, machine-readable data 128 may include various formats, such as JSON, XML, CSV, binary formats, and the like.

With continued reference to FIG. 1, in some embodiments, processor 102 may be configured to analyze input data 106 using machine vision module 126 to extract image-based attributes 124. For the purposes of this disclosure, a "machine vision module" is a type of technology that enables a computing device to inspect, evaluate and identify still or moving images. For example, in some cases a machine vision module 126 may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, alternatively or additionally, identifying image-based attribute 124 may include classifying the shape of the image-based attribute 124 to a label of the image-based attribute 124 using an image classifier; the image classifier may be trained using a plurality of images and labels of image-based attributes 124. The image classifier may be configured to determine which of a plurality of edge-detected shapes is closest to an image-based attributes 124 as determined by training using training data and selecting the determined shape as the image-based attribute 124. As a non-limiting example, the image classifier may be trained with image training data that correlates the plurality of images of image-based attributes 124 to a label of the image-based attributes 124. Alternatively, identification of the image-based attribute 124 may be performed without using computer vision and/or classification; for instance, identifying the image-based attribute 124 may further include receiving, from a user, an identification of the image-based attribute 124 in an image (image data 110).

With continued reference FIG. 1, in some embodiments, extracting a plurality of attributes 122 may include extracting text-based attributes 130 of the plurality of attributes 122 from image data 110 of input data 106 using an optical character recognition 132. For the purposes of this disclosure, a "text-based attribute" is a characteristic that consists of text. As a non-limiting example, text-based attribute 130 may include textual information, such as names, dates, addresses, identification numbers, medical terms, keywords, or labels. For example, and without limitation, an image of a document (image data 110) may contain at text-based attribute 130 like detected words, paragraphs, table structures, or logos. As another non-limiting example, text-based attribute 130 may include numerical values, such as prices, measurements, quantities, coordinates, or time stamps.

With continued reference to FIG. 1, in some embodiments, processor 102 may analyze input data 106 (e.g., image data 110) to find text-based attributes 130 using optical character recognition (OCR). For the purposes of this disclosure, "optical character recognition" is a technology that enables the recognition and conversion of printed or written text into machine-encoded text. In some cases, the at least a processor 102 may be configured to recognize a keyword using the OCR to find text-based attributes 130. As used in this disclosure, a "keyword" is an element of word or syntax used to identify and/or match elements to each other. In some cases, the at least a processor 102 may transcribe much or even substantially all input data 106.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from input data 106 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of input data 106. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the input data 106 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary.

In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 3. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes input data 106. Since the adaptive classifier may have learned something useful a little too late to recognize characters on the first pass, a second pass may be run over the input data 106. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, processor 102 may be configured to generate attribute training data. In a non-limiting example, attribute training data may include correlations between exemplary input data and exemplary attributes. In some embodiments, attribute training data may be stored in database 112. In some embodiments, attribute training data may be received from one or more users, database 112, external computing devices, and/or previous iterations of processing. As a non-limiting example, attribute training data may include instructions from a user, who may be an expert user, a past user in embodiments disclosed herein, or the like, which may be stored in memory and/or stored in database 112, where the instructions may include labeling of training examples. In some embodiments, attribute training data may be updated iteratively on a feedback loop. As a non-limiting example, processor 102 may update attribute training data iteratively through a feedback loop as a function of input data 106, output of machine vision module 126, optical character recognition 132, or the like. In some embodiments, processor 102 may be configured to generate attribute machine-learning model 134. In a non-limiting example, generating attribute machine-learning model 134 may include training, retraining, or fine-tuning attribute machine-learning model 134 using attribute training data or updated attribute training data. In some embodiments, processor 102 may be configured to extract attribute 122 from input data 106 using attribute machine-learning model 134 (i.e. trained or updated attribute machine-learning model 134). In some embodiments, generating training data and training machine-learning models may be simultaneous.

With continued reference to FIG. 1, memory 104 contains instructions configuring processor 102 to classify plurality of attributes 122 into one or more hierarchical groups 136. For the purposes of this disclosure, a "hierarchical group" is a set of associative attributes that are organized into multiple hierarchical levels or tiers. As a non-limiting example, hierarchical group 136 may include geographical location group 138, hospital group, and the like. For the purposes of this disclosure, a "geographical location group" is a hierarchical group that is organized by geographical locations. In a non-limiting example, each hierarchical levels or tiers may represent different degree of generalization or specificity. Within hierarchical group 136, attributes 122 may be arranged in a manner that establishes hierarchical relationships 140, where attributes 122 at higher levels in hierarchical relationship 140 can encompass or influence attributes 122 at lower levels in hierarchical relationship 140. The hierarchical relationship 140 disclosed herein is further described below. In a non-limiting example, attributes 122 at higher levels may provide a broader context, while attributes 122 at lower levels add more specific details or nuances within that context. For example, and without limitation, hierarchical group 136 may include a hierarchical group 136 at highest level in hierarchical relationship 140, geographical location group 138 that includes following hierarchical groups 136 at lower levels: Country group>State group>City group>District group. In some embodiments, hierarchical group 136 may be stored in database 112 and processor 102 may retrieve hierarchical group 136 from database 112.

With continued reference to FIG. 1, classifying plurality of attributes 122 includes generating classification training data 142, wherein the classification training data 142 includes exemplary attributes correlated to exemplary hierarchical groups, training a group classifier 144 using the classification training data 142 and classifying plurality of attributes 122 using the trained group classifier 144. In some embodiments, classification training data 142 may be stored in database 112. In some embodiments, classification training data 142 may be received from one or more users, database 112, external computing devices, and/or previous iterations of processing. As a non-limiting example, classification training data 142 may include instructions from a user, who may be an expert user, a past user in embodiments disclosed herein, or the like, which may be stored in memory and/or stored in database 112, where the instructions may include labeling of training examples. In some embodiments, classification training data 142 may be updated iteratively on a feedback loop. As a non-limiting example, processor 102 may update classification training data 142 iteratively through a feedback loop as a function of input data 106, image data 110, attribute 122, outputs of machine-learning models described in this disclosure, and the like. In a non-limiting example, generating group classifier 144 may include training, retraining, or fine-tuning group classifier 144 using classification training data 142 or updated classification training data 142. In some embodiments, generating training data and training machine-learning models may be simultaneous.

With continued reference to FIG. 1, in some embodiments, generating classification training data 142 may include encoding plurality of attributes 122 into a latent space using a generative model 146, generating interpolated data samples 148 by blending the plurality of encoded attributes 122 in the latent space using the generative model 146 and augmenting the classification training data 142 using the interpolated data samples 148. For the purposes of this disclosure, a "generative model" is a machine learning model that generates new data samples that resemble original data. As a non-limiting example, generative model 146 may include Variational Autoencoders (VAEs), Generative Adversarial Networks (GANs) 150, and the like. As used in this disclosure, a "generative adversarial network" is a machine learning process that includes at least two adverse networks configured to synthesize data according to prescribed rules (e.g., rules of a game). In some cases, a generative adversarial network 150 may include a generative and a discriminative network, where the generative network generates candidate data and the discriminative network evaluates the candidate data. An exemplary GAN may be described according to a following game: Each probability space $(\Omega, \mu_{ref})$ defines a GAN game. There are two adverse networks: a generator network and a discriminator network.

Generator network strategy set is $P(\Omega)$, the set of all probability measures $\mu_G$ on $\Omega$. Discriminator network strategy set is the set of Markov kernels $\mu_D: \Omega \rightarrow P[0,1]$, where $P[0,1]$ is set of probability measures on $[0,1]$. GAN game may be a zero-sum game, with objective function:

$$L(\mu_G, \mu_D) := \mathbb{E}_{x \sim \mu_{ref}, y \sim \mu_D(x)}[\ln y] + \mathbb{E}_{x \sim \mu_G, y \sim \mu_D(x)}[\ln(1-y)].$$

Generally, generator network may aim to minimize objective, and discriminator network may aim to maximize the objective. Specifically, generator network seeks to approach $\mu_G \approx \mu_{ref}$, said another way, generator network produces candidate data that matches its own output distribution as closely as possible to a reference distribution (provided with training data). Discriminator network outputs a value close to 1 when candidate data appears to be from reference (training data) distribution, and to output a value close to 0 when candidate data looks like it came from generator network distribution. Generally speaking, generative network generates candidates while discriminative network evaluates them, with contest operating in terms of data distributions. In some embodiments, generator network may learn to map from a latent space to a data distribution of interest, while discriminator network may distinguish candidates produced by the generator network from a true data distribution (e.g., training data). In some cases, generator network's training objective is to increase an error rate of discriminator network (i.e., "fool" the discriminator network by producing novel candidates that the discriminator thinks are not synthesized but, instead, are part of training data). In some cases, a known dataset may serve as initial training data for discriminator network. Training may involve presenting discriminator network with samples from training dataset until it achieves acceptable accuracy. In some cases, generator network may be trained on whether the generator network succeeds in fooling discriminator network. A generator network may be seeded with randomized input that is sampled from a predefined latent space (e.g. a multivariate normal distribution). Thereafter, candidates synthesized by generator network may be evaluated by discriminator network. Independent backpropagation procedures may be applied to both networks so that generator network may produce better samples, while discriminator network may become more skilled at flagging synthetic samples. When used for image generation, generator network may be a deconvolutional neural network, and discriminator may be a convolutional neural network.

With continued reference to FIG. 1, in some embodiments, generative model 146 may synthesize data of different types or domains, including without limitation text, code, images, molecules, audio (e.g., music), video, and the like. Exemplary generative machine learning systems trained on words or word tokens, operant in text domain, include GPT-3, LaMDA, LLAMA, BLOOM, GPT-4, and the like. Exemplary machine learning processes trained on programming language text (i.e., code) include without limitation OpenAI Codex. Exemplary machine learning processes trained on sets of images (for instance with text captions) include Imagen, DALL-E, Midjourney, Adobe Firefly, Stable Diffusion, and the like; image generative model 146, in some cases, may be trained for text-to-image generation and/or neural style transfer. Exemplary generative model 146 trained on molecular data include, without limitation, AlphaFold, which may be used for protein structure prediction and drug discovery. Generative model 146 trained on audio training data include MusicLM which may be trained on audio waveforms of music correlated with text annotations; music generative model 146, in some cases, may generate new musical samples based on text descriptions. Exemplary generative model 146 trained on video include without limitation RunwayML and Make-A-Video by Meta Platforms. Finally, exemplary generative model 146 trained using robotic action data include without limitation UniPi from Google Research.

With continued reference to FIG. 1, in some embodiments, a generative model 146 may learn a latent representation of attributes 122, mapping attributes 122 to a latent space where attributes 122 are encoded. For the purposes of this disclosure, a "latent space" is a mathematical representation that encodes data into a lower-dimensional space. Latent space may include data points that is represented as a latent vector. For the purposes of this disclosure, "encoding into a latent space" refers to transforming high-dimensional data into a compressed, lower-dimensional representation within a latent space. As a non-limiting example, generative model 146 may learn to map attributes 122 into a latent vector in a latent space. For the purposes of this disclosure, an "encoded attribute" is an attribute that is encoded in a latent space as a latent vector. For the purposes of this disclosure, an "interpolated data sample" is a newly generated data point created by blending or combining characteristics of two or more existing data in a latent space. In some embodiments, generating interpolated data samples 148 may include creating a weighted combination of latent representations of attributes 122 (latent vectors). For example, and without limitation, two images encoded into a latent space may be interpolated to produce a new image. In some embodiments, augmenting classification training data 142 may include adding interpolated data samples 148 as exemplary attributes for classification training data 142.

With continued reference to FIG. 1, memory 104 contains instructions configuring processor 102 to detect at least one missing attribute 152 in one or more hierarchical groups 136, wherein the at least one missing attribute 152 is detected when an attribute of a plurality of attributes 122 required to be in the one or more hierarchical group 136 is absent. For the purposes of this disclosure, a "missing attribute" is an attribute that is expected to be present within a hierarchical group but is absent or unavailable. In some embodiments, missing attribute 152 may be detected by comparing classified attributes 122 in hierarchical groups 136 against a predefined rule. For the purposes of this disclosure, a "predefined rule" is a rule that defines required attributes for each level of a hierarchy groups. For instance, and without limitation, a missing attribute 152 may be identified in a city group of a geographical location group 138 when information related to a city is absent but is required in a predefined rule. In some embodiments, predefined rule may be retrieved from database 112 or user may manually input predefined rule.

With continued reference to FIG. 1, in some embodiments, processor 102 may be configured to generate detection training data. In a non-limiting example, detection training data may include correlations between classified attributes or exemplary hierarchical groups and exemplary missing attributes. In some embodiments, detection training data may be stored in database 112. In some embodiments, detection training data may be received from one or more users, database 112, external computing devices, and/or previous iterations of processing. As a non-limiting example, detection training data may include instructions from a user, who may be an expert user, a past user in embodiments disclosed herein, or the like, which may be stored in memory and/or stored in database 112, where the instructions may include labeling of training examples. In some embodiments, detection training data may be updated iteratively on a feedback loop. As a non-limiting example, processor 102 may update detection training data iteratively through a feedback loop as a function of input data 106, attributes 122, hierarchical groups 136, outputs of any machine-learning models described in this disclosure, or the like. In some embodiments, processor 102 may be configured to generate detection machine-learning model. In a non-limiting example, generating detection machine-learning model may include training, retraining, or fine-tuning detection machine-learning model using detection training data or updated detection training data. In some embodiments, processor 102 may be configured to detect missing attribute 152 in hierarchical groups 136 using detection machine-learning model (i.e. trained or updated detection machine-learning model). In some embodiments, generating training data and training machine-learning models may be simultaneous.

With continued reference to FIG. 1, memory 104 contains instructions configuring processor 102 to retrieve at least one crawled attribute 154 as a function of at least one missing attribute 152. For the purposes of this disclosure, a "crawled attribute" is an attribute that is scraped from web sources. In a non-limiting example, processor 102 may retrieve crawled attribute 154 from web sources 118 to fill at least one missing attribute 152 in one or more hierarchical groups 136. For the purposes of this disclosure, a "web source" is any internet-based location or online resource that hosts or provides access to data. A web source 118 may include, but is not limited to, websites, web pages, online databases, public or private APIs, social media platforms, forums, blogs, and news websites. For example, and without limitation, web source 118 may include hospital websites, governmental agency websites, industry group websites, and the like. In some embodiments, processor 102 may retrieve crawled attribute 154 from web sources 118 using a data crawler 114. In some embodiments, crawled attribute 154 may be stored in database 112 and processor 102 may retrieve crawled attribute 154 from database 112. In some embodiments, user may manually input crawled attribute 154 that can fill missing attribute 152 in hierarchical group 136.

With continued reference to FIG. 1, in some embodiments, retrieving at least one crawled attribute 154 may include generating a prompt 156 in response to a failure to retrieve at least one crawled attribute 154 from web sources 118. For the purposes of this disclosure, a "prompt" is a prompt that can be sent to a user to notify or alert the user. As a non-limiting example, prompt 156 may include a notification, message, and the like. In a non-limiting example, prompt 156 may include a notification that indicating a user that there is missing attribute 152. In some embodiments, processor 102 may receive a user input from a user and update hierarchical group 136 using the user input using a group classifier 144. For the purposes of this disclosure, a "user input" is any data input by a user. As a non-limiting example, user input may include crawled attribute 154.

With continued reference to FIG. 1, in some embodiments, processor 102 may generate prompt 156 using a large language model (LLM). A "large language model," as used herein, is a deep learning algorithm that can recognize, summarize, translate, predict and/or generate text and other content based on knowledge gained from massive datasets. LLM may be a type of generative artificial intelligence (AI). LLMs may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs, in some embodiments, may include GPT, GPT-2, GPT-3, and other language processing models. LLM may be used to augment the text in an article based on a prompt. Training data may correlate content data to plurality of prompts. Training data may correlate elements of a dictionary related to linguistics, as described above, to a prompt. LLM may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM may output such predictions by ranking words by likelihood or a prompt parameter. For the example given above, the LLM may score "you" as the most likely, "your" as the next most likely, "his" or "her" next, and the like.

Still referring to FIG. 1, LLM may include an attention mechanism, utilizing a transformer. LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set.

Still referring to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you," with "how" and "are." It's also possible that LLM learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiply using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers May allow LLM to learn to extract and focus on different combinations of attention from its attention heads.

With continued reference to FIG. 1, in some embodiments, LLM may be specifically trained using large language model (LLM) training data. In some embodiments, LLM training data may include correlations between exemplary missing attributes or attributes and exemplary prompts. In some embodiments, LLM training data may include a set of data that is in user's voice, email, or the like to mimic them. In some embodiments, LLM training data may be consistent with any training data described in the entirety of this disclosure. In some embodiments, LLM training data may be received from one or more users, database 112, external computing devices, and/or previous iterations of processing. As a non-limiting example, LLM training data may include instructions from a user, who may be an expert user, a past user in embodiments disclosed herein, or the like, which may be stored in memory and/or stored in database 112, where the instructions may include labeling of training examples. In some embodiments, LLM training data may be updated iteratively through a feedback loop. As a non-limiting example, LLM training data may be updated iteratively through a feedback loop as a function of newly collected input data 106, attributes 122, missing attributes 152, crawled attributes 154, output of machine-learning models described herein, or the like. In some embodiments, processor 102 may be configured to generate LLM. In a non-limiting example, generating LLM may include training, retraining, or fine-tuning LLM using LLM training data or updated LLM training data. In some embodiments, processor 102 may be configured to generate prompt 156 using LLM (i.e. trained or updated LLM).

With continued reference to FIG. 1, retrieving at least one crawled attribute 154 includes simulating user actions 158 to dynamically load contents for retrieving the at least one crawled attribute 154 from web sources 118 until the at least one crawled attribute 154 is found to fill at least one missing attribute 152 and updating one or more hierarchical groups 136 as a function of the at least one crawled attribute 154 using group classifier 144. For the purposes of this disclosure, a "user action" is interactions of a user with a digital interface. As a non-limiting example, user action 158 may include scrolling, clicking buttons, hovering, typing, touch gestures, dragging, dropping, and the like. In some embodiments, user action 158 may trigger specific response or changes in contents or functionality of interface. In a non-limiting example, scrolling can reveal additional content that is not initially visible. In another non-limiting example, clicking buttons can load new contents, open a new page, expand a dropdown menu, and the like. In a non-limiting example, a user action 158 may be simulated by processor 102 using a data crawler 114 to scroll down a webpage (web source 118) until address of a facility (e.g., missing attribute 152) is found, or to click a "Load More" button to retrieve additional entries that are not initially visible. In another non-limiting example, processor 102 may be configured to simulate user actions 158 such as hovering over elements to reveal hidden information, or entering search queries into a search bar to filter and load specific data on a webpage. In some embodiments, processor 102 may classify crawled attribute 154 into one or more hierarchical groups 136 using a group classifier 144; hence updating hierarchical groups 136 to include crawled attribute 154 in the place of missing attribute 152.

With continued reference to FIG. 1, memory 104 contains instructions configuring processor 102 to generate a hierarchical data structure 160 as a function of one or more updated hierarchical groups 136. For the purposes of this disclosure, a "hierarchical data structure" is structured organization of data that is organized into multiple hierarchical nodes. In some embodiments, hierarchical data structure 160 may provide a summarization, representation, or otherwise abstraction of hierarchical group 136. In some embodiments, hierarchical data structure 160 may include a form of text, graph, trend line, chart, audio, animation, image, video, and the like. In some embodiments, hierarchical data structure 160 may be stored in database 112 and processor 102 may retrieve hierarchical data structure 160. In some embodiments, user may manually generate hierarchical data structure 160.

With continued reference to FIG. 1, in some embodiments, hierarchical data structure 160 may include a graph-based structure 162, wherein each parent node 164 of the graph-based structure 162 can represent a parent group 166 of the one or more updated hierarchical groups 136 and each child node 168 of the parent node 164 can represent a child group 170 of the one or more updated hierarchical groups 136. For the purposes of this disclosure, a "graph-based structure" is a data structure that represents hierarchical relationships between attributes. For the purposes of this disclosure, a "parent node" is a node that is a higher-level entity than a child node. For the purposes of this disclosure, a "child node" is a node that is a lower-level entity than a parent node. For the purposes of this disclosure, a "parent group" is a group that is at a higher level within a hierarchical structure than a child group. For the purposes of this disclosure, a "child group" is a group that is at a lower level within a hierarchical structure than a parent group. For example, and without limitation, a city group may be a child group 170 under the parent group 166, a state group in a geographical location group 138.

With continued reference to FIG. 1, in some embodiments, generating hierarchical data structure 160 may include linking a plurality of attributes 122 and at least one crawled attribute 154 based on their hierarchical relationships 140 and organizing the plurality of attributes 122 and the at least one crawled attribute 154 into corresponding nodes (e.g., parent node 164 and child node 168) of a graph-based structure 162 as a function of the link. For the purposes of this disclosure, a "hierarchical relationship" is a relationship between attributes in which they are organized into different levels or tiers. As a non-limiting example, hierarchical relationship 140 may include parent-child structure, dependency, transitive relationship, and the like. In some embodiments, processor 102 may determine hierarchical relationship 140 between attributes 122 using a relationship machine-learning model. In some embodiments, processor 102 may be configured to generate relationship training data. In a non-limiting example, relationship training data may include correlations between exemplary attributes and exemplary hierarchical relationships. In some embodiments, relationship training data may be stored in database 112. In some embodiments, relationship training data may be received from one or more users, database 112, external computing devices, and/or previous iterations of processing. As a non-limiting example, relationship training data may include instructions from a user, who may be an expert user, a past user in embodiments disclosed herein, or the like, which may be stored in memory and/or stored in database 112, where the instructions may include labeling of training examples. In some embodiments, relationship training data may be updated iteratively on a feedback loop. As a non-limiting example, processor 102 may update relationship training data iteratively through a feedback loop as a function of input data 106, attribute 122, missing attribute 152, crawled attribute 154, or the like. In some embodiments, processor 102 may be configured to generate relationship machine-learning model. In a non-limiting example, generating relationship machine-learning model may include training, retraining, or fine-tuning relationship machine-learning model using relationship training data or updated relationship training data. In some embodiments, processor 102 may be configured to determine hierarchical relationship 140 between attributes 122 using relationship machine-learning model (i.e. trained or updated relationship machine-learning model). In some embodiments, generating training data and training machine-learning models may be simultaneous.

With continued reference to FIG. 1, in some embodiments, processor 102 may generate user interface 120 to display hierarchical data structure 160. For the purposes of this disclosure, a "user interface" is a means by which a user and a computer system interact; for example through the use of input devices and software. A user interface 120 may include a graphical user interface (GUI), command line interface (CLI), menu-driven user interface, touch user interface, voice user interface (VUI), form-based user interface, any combination thereof and the like. In some embodiments, user interface 120 may operate on and/or be communicatively connected to a decentralized platform, metaverse, and/or a decentralized exchange platform associated with the user. For example, a user may interact with user interface in virtual reality. In some embodiments, a user may interact with the user interface 120 using a computing device distinct from and communicatively connected to at least a processor 102. For example, a smart phone, smart, tablet, or laptop operated by a user. In an embodiment, user interface 120 may include a graphical user interface. A "graphical user interface," as used herein, is a graphical form of user interface that allows users to interact with electronic devices. In some embodiments, GUI may include icons, menus, visual indicators 172 or representations (graphics), audio indicators, and display information and related user controls. In some embodiments, generating hierarchical data structure 160 may include generating a visual indicator 172 for at least one missing attribute 152 in response to a failure to retrieve at least one crawled attribute 154 from web sources 118. For the purposes of this disclosure, a "visual indicator" is a graphical element that is used to convey information or draw attention to a status or condition within a hierarchical data structure. As a non-limiting example, visual indicator 172 may include icons, symbols, color changes, shapes, animations, and the like. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

Figure 2:
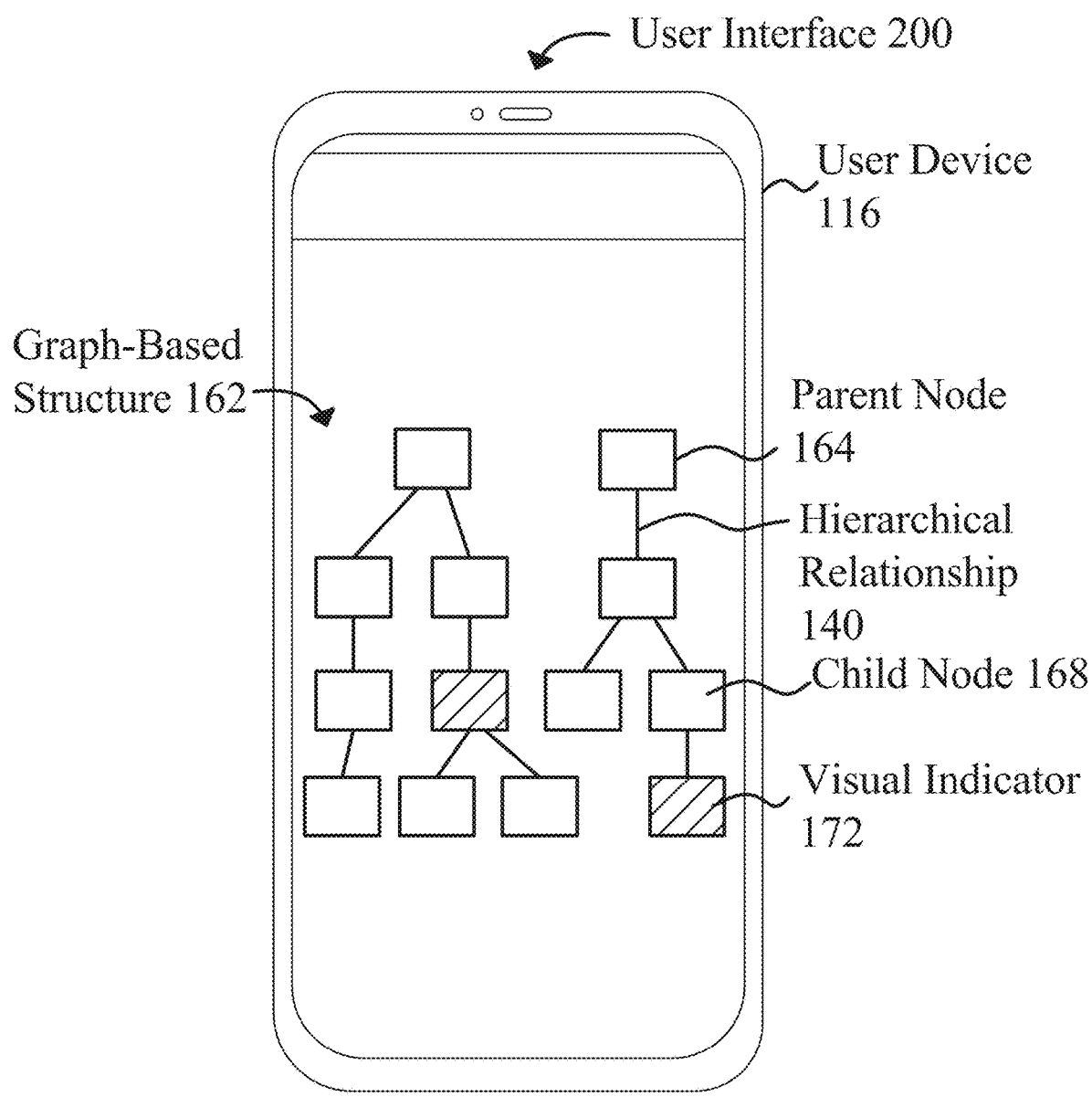
FIG. 2 illustrates an exemplary user interface displaying a hierarchical data structure.

Referring now to FIG. 2, exemplary user interface 200 displaying a hierarchical data structure 160 on a user device 116 is illustrated. The user interface 200 may be consistent with user interface 120. As a non-limiting example, user device 116 may include a laptop, desktop, tablet, mobile phone, smart phone, smart watch, kiosk, screen, smart headset, or things of the like. In some embodiments, hierarchical data structure 160 may provide a summarization, representation, or otherwise abstraction of hierarchical group 136. In some embodiments, hierarchical data structure 160 may include a form of text, graph, trend line, chart, audio, animation, image, video, and the like. In some embodiments, hierarchical data structure 160 may include a graph-based structure 162, wherein each parent node 164 of the graph-based structure 162 can represent a parent group 166 of the one or more updated hierarchical groups 136 and each child node 168 of the parent node 164 can represent a child group 170 of the one or more updated hierarchical groups 136. Within hierarchical data structure 160, attributes 122 in hierarchical groups 136 may be arranged in a manner that establishes hierarchical relationships 140, where attributes 122 at higher levels in hierarchical relationship 140 can encompass or influence attributes 122 at lower levels in hierarchical relationship 140. In some embodiments, generating hierarchical data structure 160 may include linking a plurality of attributes 122 based on their hierarchical relationships 140 and organizing the plurality of attributes 122 into corresponding nodes (e.g., parent node 164 and child node 168) of a graph-based structure 162 as a function of the link. In some embodiments, generating hierarchical data structure 160 may include generating a visual indicator 172 for at least one missing attribute 152 in response to a failure to retrieve at least one crawled attribute 154 from web sources 118. As a non-limiting example, visual indicator 172 may include icons, symbols, color changes, shapes, animations, and the like.

Figure 3:
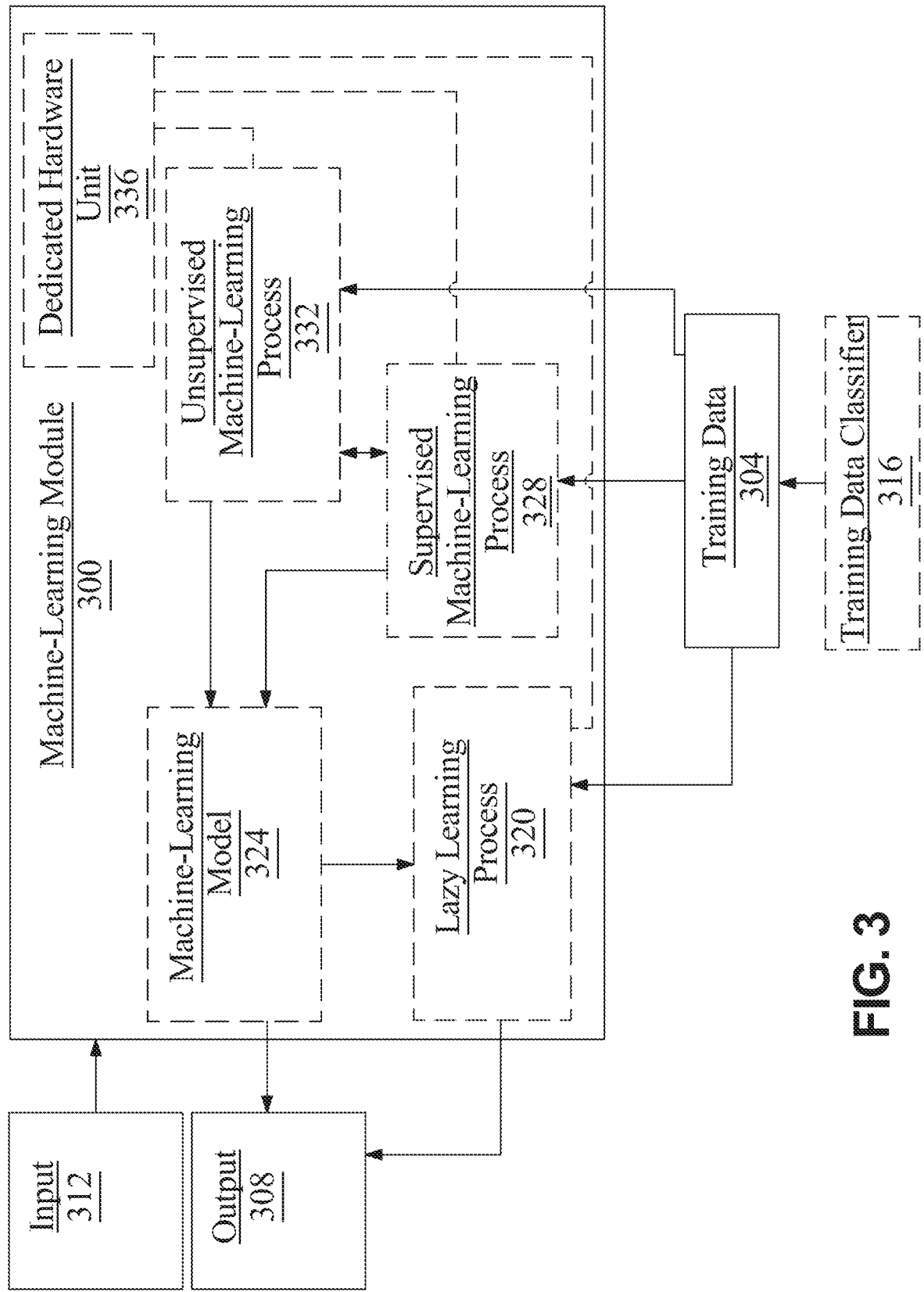
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include input data 106, attributes 122, missing attributes 152, crawled attributes 154, hierarchical groups 136, and the like. As a non-limiting illustrative example, output data may include attributes 122, missing attributes 152, crawled attributes 154, hierarchical groups 136, hierarchical data structure 160, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to facility cohorts, such as facility's location, size, industry, and the like.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)÷P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2}.$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}{:}X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input data 106, attributes 122, missing attributes 152, crawled attributes 154, hierarchical groups 136, and the like as described above as inputs, attributes 122, missing attributes 152, crawled attributes 154, hierarchical groups 136, hierarchical data structure 160, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
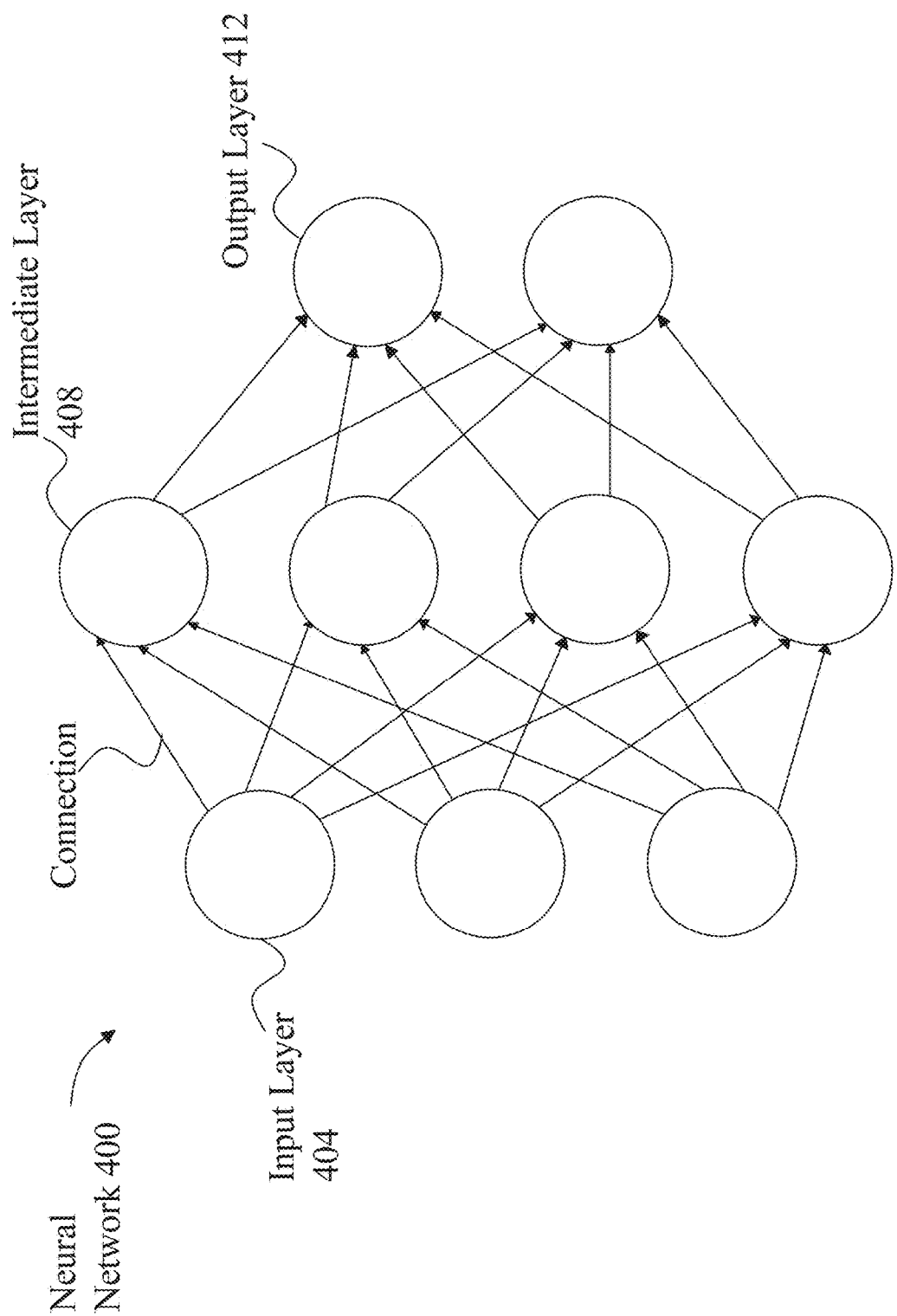
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
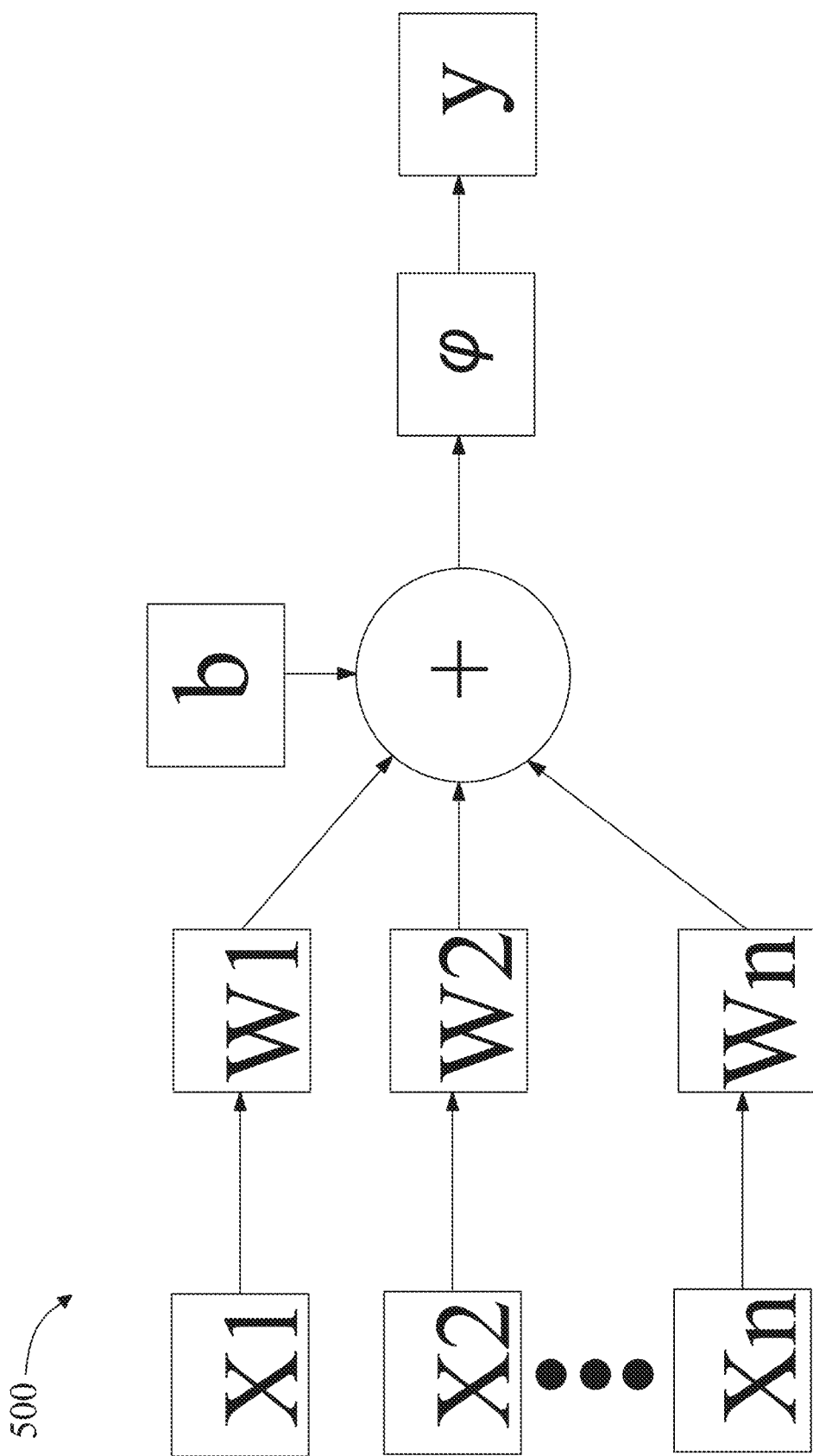
FIG. 5 illustrates a block diagram of an exemplary node in a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh(hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
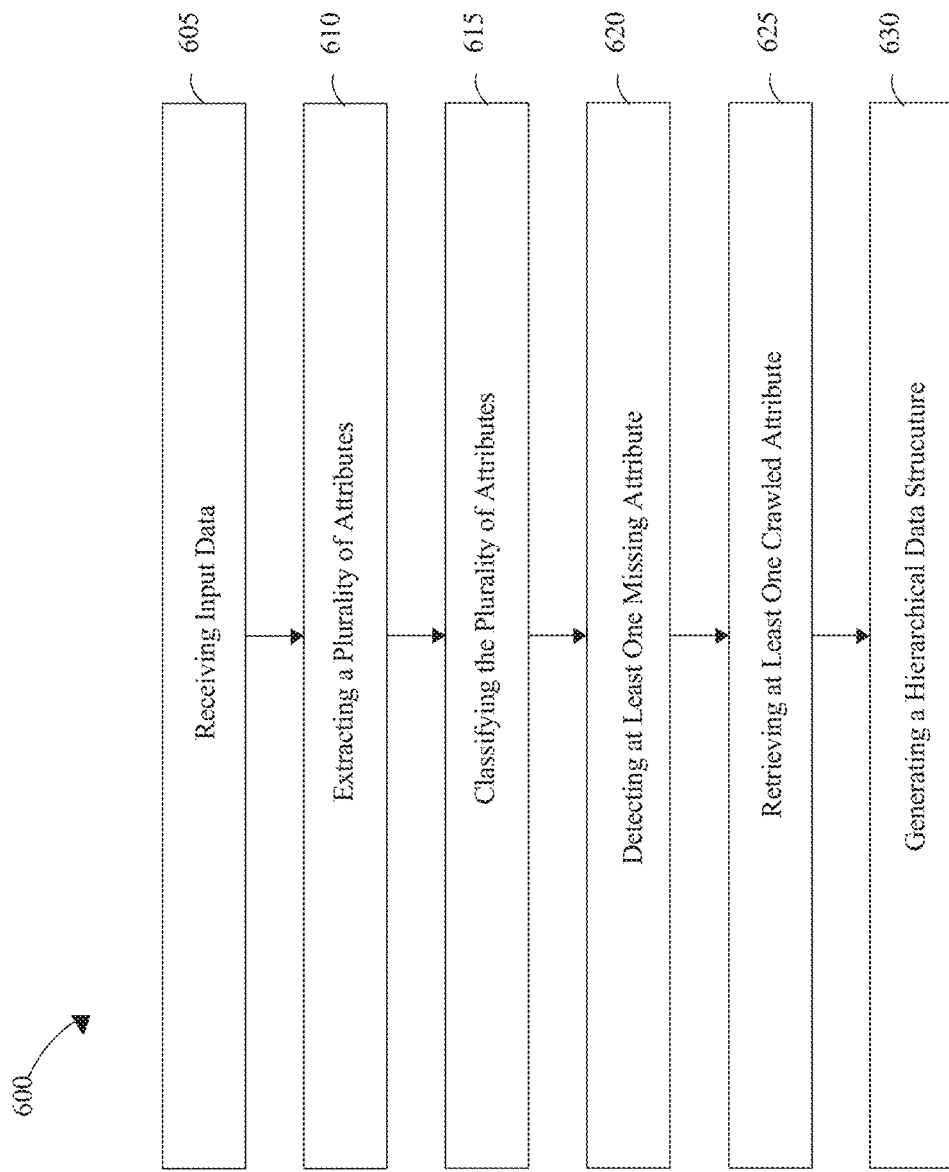
FIG. 6 illustrates a flow diagram of an exemplary method for generative interpolation.

Referring now to FIG. 6, a flow diagram of an exemplary method 600 for generative interpolation. Method 600 contains a step 605 of receiving, using at least a processor, input data from one or more data sources. This may be implemented as reference to FIGS. 1-5.

With continued reference to FIG. 6, method 600 contains a step 610 of extracting, using at least a processor, a plurality of attributes from input data. This may be implemented as reference to FIGS. 1-5.

With continued reference to FIG. 6, method 600 contains a step 615 of classifying, using at least a processor, a plurality of attributes into one or more hierarchical groups, wherein classifying the plurality of attributes includes generating classification training data, wherein the classification training data includes exemplary attributes correlated to exemplary hierarchical groups, training a group classifier using the classification training data and classifying the plurality of attributes using the trained group classifier. In some embodiments, extracting the plurality of attributes may include extracting image-based attributes of the plurality of attributes from image data of the input data using a machine vision module and converting the image-based attributes into machine-readable data. In some embodiments, extracting the plurality of attributes may include extracting text-based attributes of the plurality of attributes from image data of the input data using an optical character recognition. In some embodiments, generating the classification training data may include encoding the plurality of attributes into a latent space using a generative model, generating interpolated data samples by blending the plurality of encoded attributes in the latent space using the generative model, and augmenting the classification training data using the interpolated data samples. In some embodiments, the generative model may include a generative adversarial network. In some embodiments, the one or more hierarchical groups may include a geographic location group. These may be implemented as reference to FIGS. 1-5.

With continued reference to FIG. 6, method 600 contains a step 620 of detecting, using at least a processor, at least one missing attribute in one or more hierarchical groups, wherein the at least one missing attribute is detected when an attribute of a plurality of attributes required to be in the one or more hierarchical group is absent. These may be implemented as reference to FIGS. 1-5.

With continued reference to FIG. 6, method 600 contains a step 625 of retrieving, using at least a processor, at least one crawled attribute as a function of at least one missing attribute, wherein retrieving the at least one crawled attribute includes simulating user actions to dynamically load contents for retrieving the at least one crawled attribute from web sources until the at least one crawled attribute is found to fill the at least one missing attribute in the one or more hierarchical groups and updating the one or more hierarchical groups as a function of the at least one crawled attribute using a group classifier. In some embodiments, retrieving the at least one crawled attribute may include generating a prompt in response to a failure to retrieve the at least one crawled attribute from the web sources. These may be implemented as reference to FIGS. 1-5.

With continued reference to FIG. 6, method 600 contains a step 630 of generating, using at least a processor, a hierarchical data structure as a function of one or more updated hierarchical groups. In some embodiments, the hierarchical data structure may include a graph-based structure, wherein each parent node of the graph-based structure represents a parent group of the one or more updated hierarchical groups and each child node of the parent node represents a child group of the one or more updated hierarchical groups. In some embodiments, generating the hierarchical data structure may include linking the plurality of attributes and the at least one crawled attribute based on their hierarchical relationships and organizing the plurality of attributes and the at least one crawled attribute into corresponding nodes of the graph-based structure as a function of the link. In some embodiments, generating the hierarchical data structure may include generating a visual indicator for the at least one missing attribute in response to a failure to retrieve the at least one crawled attribute from the web sources. These may be implemented as reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
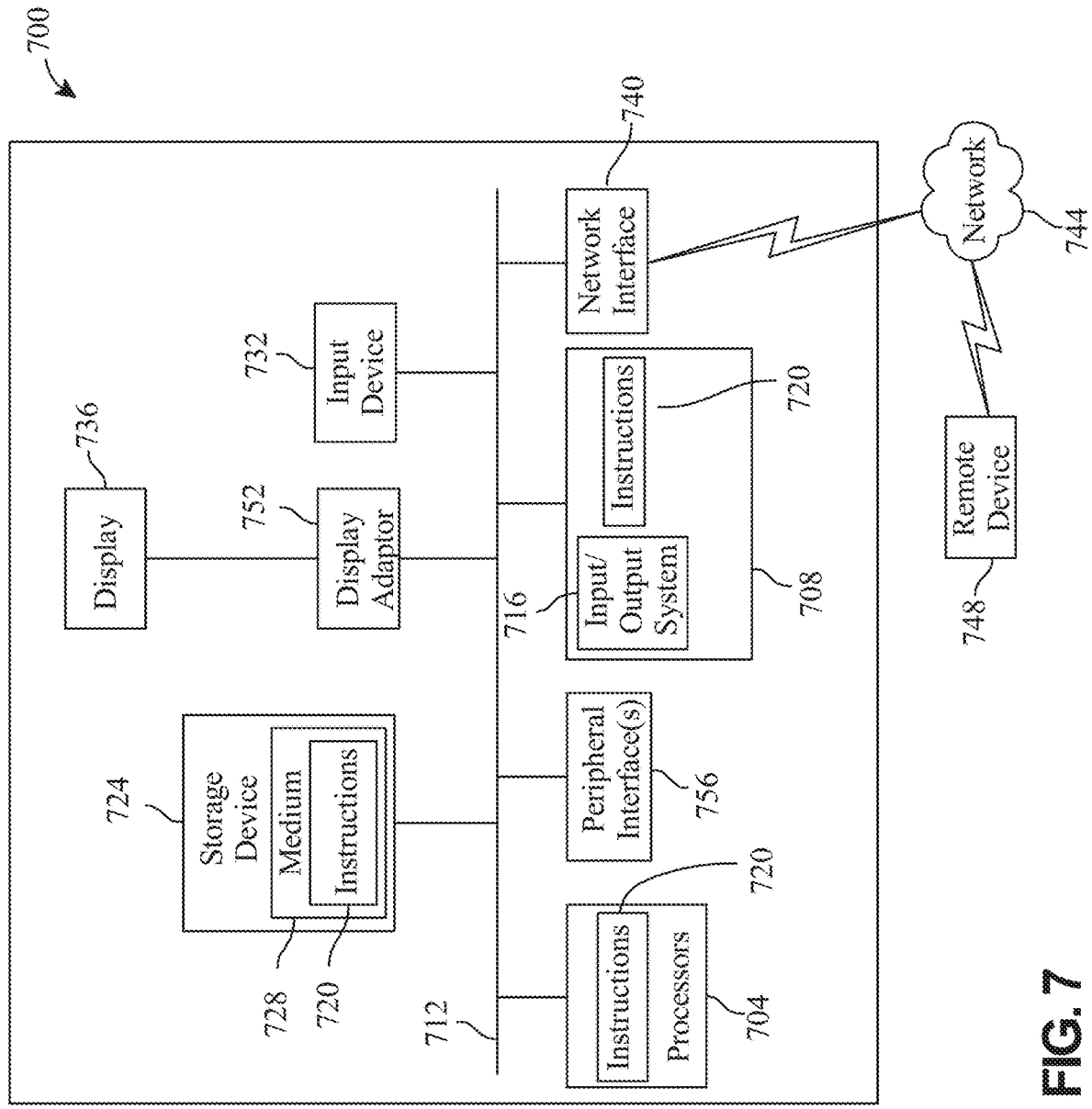
FIG. 7 illustrates a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and memory 708 that communicate with each other, and with other components, via a bus 712. Bus 712 may include any of several types of bus structures including, but not limited to, memory bus, memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generative interpolation, the apparatus comprising:
   at least one processor; and
   a memory communicatively connected to the at least one processor, wherein the memory contains instructions configuring the at least one processor to:
   receive input data from one or more data sources;
   extract a plurality of attributes from the input data;
   classify the plurality of attributes into one or more hierarchical groups, wherein classifying the plurality of attributes comprises:
      generating classification training data, wherein the classification training data comprises exemplary attributes correlated to exemplary hierarchical groups;
      training a group classifier using the classification training data; and
      classifying the plurality of attributes using the trained group classifier;
   detect at least one missing attribute in the one or more hierarchical groups, wherein the at least one missing attribute is detected when an attribute of the plurality of attributes required to be in the one or more hierarchical group is absent;
   retrieve at least one crawled attribute as a function of the at least one missing attribute, wherein retrieving the at least one crawled attribute comprises:
      dynamically loading contents for retrieving the at least one crawled attribute from web sources until the at least one crawled attribute is found to fill the at least one missing attribute in the one or more hierarchical groups; and
      updating the one or more hierarchical groups as a function of the at least one crawled attribute using the group classifier; and
   generate a hierarchical data structure as a function of the one or more updated hierarchical groups.

2. The apparatus of claim 1, wherein extracting the plurality of attributes comprises:
   extracting image-based attributes of the plurality of attributes from image data of the input data using a machine vision module; and
   converting the image-based attributes into machine-readable data.

3. The apparatus of claim 1, wherein extracting the plurality of attributes comprises extracting text-based attributes of the plurality of attributes from image data of the input data using an optical character recognition.

4. The apparatus of claim 1, wherein generating the classification training data comprises:
   encoding the plurality of attributes into a latent space using a generative model;
   generating interpolated data samples by blending the plurality of encoded attributes in the latent space using the generative model; and
   augmenting the classification training data using the interpolated data samples.

5. The apparatus of claim 4, wherein the generative model comprises a generative adversarial network.

6. The apparatus of claim 1, wherein the one or more hierarchical groups comprises a geographic location group.

7. The apparatus of claim 1, wherein retrieving the at least one crawled attribute comprises generating a prompt in response to a failure to retrieve the at least one crawled attribute from the web sources.

8. The apparatus of claim 1, wherein the hierarchical data structure comprises a graph-based structure, wherein:
   each parent node of the graph-based structure represents a parent group of the one or more updated hierarchical groups; and
   each child node of the parent node represents a child group of the one or more updated hierarchical groups.

9. The apparatus of claim 8, wherein generating the hierarchical data structure comprises:

linking the plurality of attributes and the at least one crawled attribute based on their hierarchical relationships; and organizing the plurality of attributes and the at least one crawled attribute into corresponding nodes of the graph-based structure as a function of the link.

10. The apparatus of claim 1, wherein generating the hierarchical data structure comprises generating a visual indicator for the at least one missing attribute in response to a failure to retrieve the at least one crawled attribute from the web sources.

11. A method for generative interpolation, the method comprising:
receiving, using at least a processor, input data from one or more data sources;
extracting, using the at least a processor, a plurality of attributes from the input data;
classifying, using the at least a processor, the plurality of attributes into one or more hierarchical groups, wherein classifying the plurality of attributes comprises:
generating classification training data, wherein the classification training data comprises exemplary attributes correlated to exemplary hierarchical groups;
training a group classifier using the classification training data; and
classifying the plurality of attributes using the trained group classifier;
detecting, using the at least a processor, at least one missing attribute in the one or more hierarchical groups, wherein the at least one missing attribute is detected when an attribute of the plurality of attributes required to be in the one or more hierarchical group is absent;
retrieving, using the at least a processor, at least one crawled attribute as a function of the at least one missing attribute, wherein retrieving the at least one crawled attribute comprises:
dynamically loading contents for retrieving the at least one crawled attribute from web sources until the at least one crawled attribute is found to fill the at least one missing attribute in the one or more hierarchical groups; and
updating the one or more hierarchical groups as a function of the at least one crawled attribute using the group classifier; and
generating, using the at least a processor, a hierarchical data structure as a function of the one or more updated hierarchical groups.

12. The method of claim 11, wherein extracting the plurality of attributes comprises:
extracting image-based attributes of the plurality of attributes from image data of the input data using a machine vision module; and
converting the image-based attributes into machine-readable data.

13. The method of claim 11, wherein extracting the plurality of attributes comprises extracting text-based attributes of the plurality of attributes from image data of the input data using an optical character recognition.

14. The method of claim 11, wherein generating the classification training data comprises:
encoding the plurality of attributes into a latent space using a generative model;
generating interpolated data samples by blending the plurality of encoded attributes in the latent space using the generative model; and
augmenting the classification training data using the interpolated data samples.

15. The method of claim 14, wherein the generative model comprises a generative adversarial network.

16. The method of claim 11, wherein the one or more hierarchical groups comprises a geographic location group.

17. The method of claim 11, wherein retrieving the at least one crawled attribute comprises generating a prompt in response to a failure to retrieve the at least one crawled attribute from the web sources.

18. The method of claim 11, wherein the hierarchical data structure comprises a graph-based structure, wherein:
each parent node of the graph-based structure represents a parent group of the one or more updated hierarchical groups; and
each child node of the parent node represents a child group of the one or more updated hierarchical groups.

19. The method of claim 18, wherein generating the hierarchical data structure comprises:
linking the plurality of attributes and the at least one crawled attribute based on their hierarchical relationships; and
organizing the plurality of attributes and the at least one crawled attribute into corresponding nodes of the graph-based structure as a function of the link.

20. The method of claim 11, wherein generating the hierarchical data structure comprises generating a visual indicator for the at least one missing attribute in response to a failure to retrieve the at least one crawled attribute from the web sources.

\* \* \* \* \*